(12) United States Patent
Tamai et al.

(10) Patent No.: US 6,621,993 B2
(45) Date of Patent: Sep. 16, 2003

(54) IMAGE PROCESSING APPARATUS, IMAGE-FORMING APPARATUS, IMAGE FORMING SYSTEM, AND IMAGE-JOB LINKING METHOD

(75) Inventors: Yoshiyuki Tamai, Itami (JP); Hiroshi Murakami, Toyokawa (JP); Hiroaki Ikeda, Itami (JP); Tomoyuki Atsumi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/987,366

(22) Filed: Nov. 14, 2001

(65) Prior Publication Data

US 2002/0061204 A1 May 23, 2002

(30) Foreign Application Priority Data

Nov. 20, 2000 (JP) .......................................... 00-0353121

(51) Int. Cl.$^7$ ................................................ G03G 15/00
(52) U.S. Cl. .......................................... 399/82; 399/83
(58) Field of Search ................................ 399/8, 42, 82, 399/83, 84, 85, 407, 408, 410; 358/1.15, 1.16, 1.17, 296

(56) References Cited

U.S. PATENT DOCUMENTS 5,081,494 A    1/1992    Reed et al.
5,243,381 A    9/1993    Hube
5,528,375 A  * 6/1996    Wegeng ...................... 358/296
6,151,131 A   11/2000    Pepin et al.
6,166,826 A  * 12/2000   Yokoyama .................. 358/1.16
6,201,610 B1 * 3/2001    Ogino ........................ 358/1.15

FOREIGN PATENT DOCUMENTS

EP    0 863 658 A2    9/1998
JP    07-078181       3/1995
JP    09-305584       11/1997
JP    11-243463       9/1999

* cited by examiner

*Primary Examiner*—Hoan Tran
(74) *Attorney, Agent, or Firm*—Burns, Doane, Swecker & Mathis, LLP

(57) ABSTRACT

In an image processing apparatus capable of easily preparing a document having plural kinds of images and printing sheets, a plurality of management jobs containing linkage data, such as the order of linking image jobs are stored and registered in storage 32. In linking the image jobs, one of the registered management jobs is selected. Then, a controller 34 causes the execution of linking the plurality of image jobs on the basis of the linkage data of the selected management job. Accordingly, the information of the plurality of image jobs can be treated independently of the information of the data for linking the plurality of image jobs. This permits easy preparation of a linked document having a plurality of images.

18 Claims, 14 Drawing Sheets

Please select an image formation mode for job 2

| mode name | |
|---|---|
| 1 Control specification form main body | A4 x 1.0 1 in 1 both-sided plane |
| 2 For chapter separated page | A4 x 1.0 1 in 1 single-sided MP |
| 3 Both-sided 4 in 1 for DR | A4 4 in 1 both-sided |
| 4 A4Y Both-sided 2 in 1 | A4Y 2 in 1 both-sided plane |
| 5 Single sided staple | A3T x1.0 1 in 1 single-sided Stp | image formation will start on pushing "complete"

P10 back  complete

IMAGE PROCESSING APPARATUS, IMAGE-FORMING APPARATUS, IMAGE FORMING SYSTEM, AND IMAGE-JOB LINKING METHOD

CROSS-REFERENCE TO RELATED APPLICATIONS

The present application claims the priority of Japanese Patent Application No. 00-0353121, filed in Japan on Nov. 20, 2000, the entire contents of which are hereby incorporated herein by reference.

BACKGROUND OF THE INVENTION

1. Field of the Invention

The present invention relates to an image processing apparatus, an image forming apparatus, an image processing system, and an image-job linking method for linking a plurality of image jobs to be treated by a digital copy machine, a printer, a facsimile machine, and the like, and thereby preparing a document composed of different types of images and printing sheets.

2. Description of Related Art

A kind of digital copy machine, which is an image processing apparatus and image forming apparatus, has the function of linking a plurality of image jobs, for example, for the purpose of preparing a document into which another document containing image information is inserted at a specific position.

Japanese Laid-open Patent Publications No. Hei 6-297781 and No. Hei 7-78181 disclose configurations in which image jobs are stored in a memory and in which the image jobs are rearranged and linked when the image jobs are selected using a job reference sheet, an index sheet, or the like.

Further, Japanese Laid-open Patent Publication No. Hei 11-243463 discloses a configuration in which a plurality of stored image jobs can be linked in an arbitrary order.

In the configurations shown in Japanese Laid-open Patent Publications No. Hei 6-297781 and No. Hei 7-78181, the information indicating the document structure, that is, which image jobs are to be rearranged cannot be treated independently of the information indicating the procedure of rearranging these image jobs. This causes a poor operational flexibility. For example, when part of the linked image jobs is to be replaced with other image jobs, it is a tedious job of outputting a job reference sheet and thereby inserting the new image jobs at desired positions.

Further, in the configuration shown in Japanese Laid-open Patent Publication No. Hei 11-243463, in order to rearrange a document, a user needs to select image jobs in the order of rearrangement.

OBJECTS AND SUMMARY

The present invention has been devised to resolve such problems. An object of the present invention is to provide an image processing apparatus, an image forming apparatus, an image processing system, and an image-job linking method capable of easily preparing a linked document composed of different types of images and printing sheets without tedious work.

The above-mentioned problem is resolved by an image processing apparatus comprising a memory for storing a plurality of management jobs, each of the management jobs defining linkage data for linking a plurality of image jobs, each of the image jobs containing image data; a selector for selecting a management job among said plurality of management jobs stored in said memory; and a controller for linking said plurality of image jobs based on the linkage data defined in said selected management job selected by said selector.

In the image processing apparatus, said plurality of management jobs each defining linkage data for linking said plurality of image jobs each containing image data are stored. When a predetermined management job is selected, said plurality of image jobs are linked on the basis of the linkage data defined in the selected management job.

In other words, the information of said plurality of image jobs can be treated independently of the information of said data for linking said plurality of image jobs. This permits easy preparation of a linked document composed of plural kinds of images and printing sheets.

In this image processing apparatus, said linkage data defined in each said management job may be data indicating the order of linking said plurality of image jobs. In this case, said plurality of image jobs are linked in said order of linkage.

In the image processing apparatus, said linkage data defined in each said management job may include data indicating a post-process to be applied to the linked image jobs. In this case, said post-process is applied to said linked image jobs.

In the image processing apparatus, said linkage data defined in each said management job may be data for linking a second image job as a background image to a first image job. In this case, said second image job is linked as a background image to said first image job.

In the image processing apparatus, said linkage data defined in each said management job may include data indicating image processing to be applied to said plurality of image jobs. In this case, said image processing is applied to said plurality of image jobs.

The image processing apparatus may comprise image-job selecting means for selecting a plurality of image jobs to be linked according to said selected management job. In this case, said plurality of image jobs are selected and then linked according to said selected management job.

Further, the above-mentioned problem is resolved by an image forming apparatus comprising a memory for storing a plurality of management jobs, each of the plurality of management jobs defining linkage data for linking a plurality of image jobs, each of the plurality of image jobs containing image data; a selector for selecting a management job among said plurality of management jobs stored in said memory; an image forming device; and a controller for causing said image forming device to output said plurality of image jobs in a linked state with each other based on the linkage data defined in said management job selected by said selecting means.

In the image forming apparatus, said plurality of management jobs stored in said storing means are used in linking said image jobs. When a predetermined management job is selected, said image forming means outputs said plurality of image jobs in a linked state with each other on the basis of the linkage data defined in said selected management job. This configuration permits easy acquisition of a document composed of plural kinds of images and printing sheets.

Furthermore, the above-mentioned problem is resolved by an image processing system comprising a memory for storing a plurality of management jobs, each of the plurality of management jobs defining linkage data for linking a plurality of image jobs, each of the plurality of image jobs containing image data received from an external computer; a selector for selecting a management job among said plurality of management jobs stored in said memory; and a controller for causing the process of linking said plurality of image jobs based on the linkage data defined in said management job selected by said selector.

In the image processing system, said plurality of management jobs stored in said storing means are used in linking said plurality of image jobs each received from an external computer. When a predetermined management job is selected among said plurality of management jobs, said plurality of image jobs are linked on the basis of the linkage data defined in said selected management job. Accordingly, the information of the plurality of image jobs can be treated independently of the information of the linkage data for the image jobs. This permits easy preparation of a document composed of plural kinds of images and printing sheets.

Further, the above-mentioned problem is resolved by an image-job linking method for linking a plurality of image jobs each containing image data, comprising the steps of storing in a memory a plurality of management jobs, each of the plurality of management jobs defining linkage data for linking said plurality of image jobs; selecting one of the management jobs from said memory; and linking said plurality of image jobs based on the linkage data defined in said selected management job.

In the image-job linking method, said plurality of management jobs stored in said storing means are used as default in linking said plurality of image jobs. When a predetermined management job is selected among said plurality of management jobs, said plurality of image jobs are linked on the basis of the linkage data defined in said selected management job.

In the image processing apparatus, the image forming apparatus, the image processing system, and the image-job linking method described above, the objective data for the linkage may be processed on a page basis. In this case, the linkage is processed on a page basis.

BRIEF DESCRIPTION OF THE DRAWINGS

FIG. 12(c) is a diagram showing another screen for selecting an image formation mode.

DETAILED DESCRIPTION OF THE PREFERRED EMBODIMENTS

Figure 1:
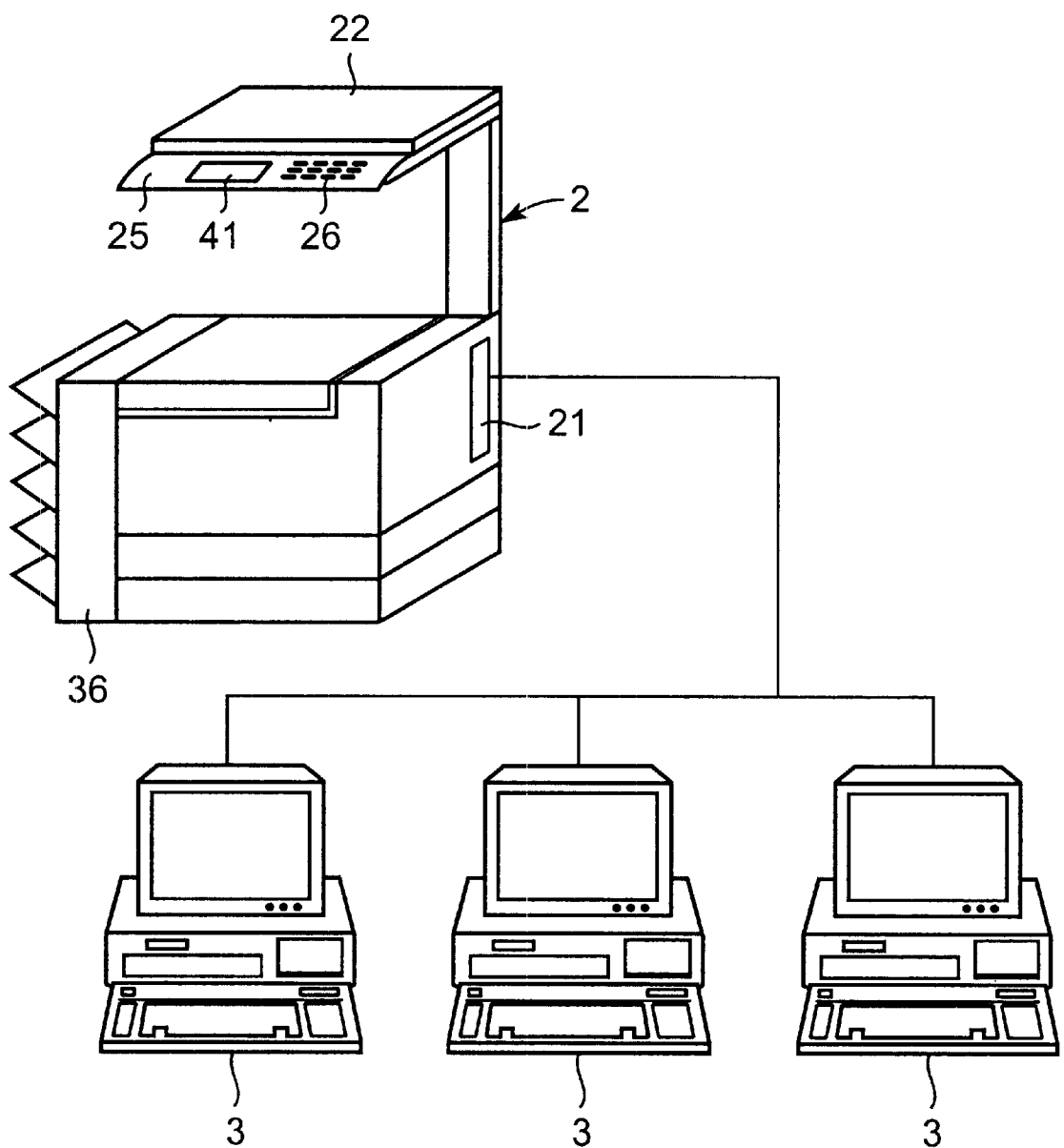
FIG. 1 is a diagram showing the layout of an image forming system according to an embodiment of the invention.

FIG. 1 is a diagram showing the layout of an image forming apparatus according to an embodiment of the invention.

In FIG. 1, an image forming system 1 comprises an image forming apparatus 2 as an image processing apparatus; and a plurality of external client computers (PC's, hereafter) 3. The image forming apparatus 2 receives image data and signals from the PC's 3 via a data receiving section 21.

Figure 2:
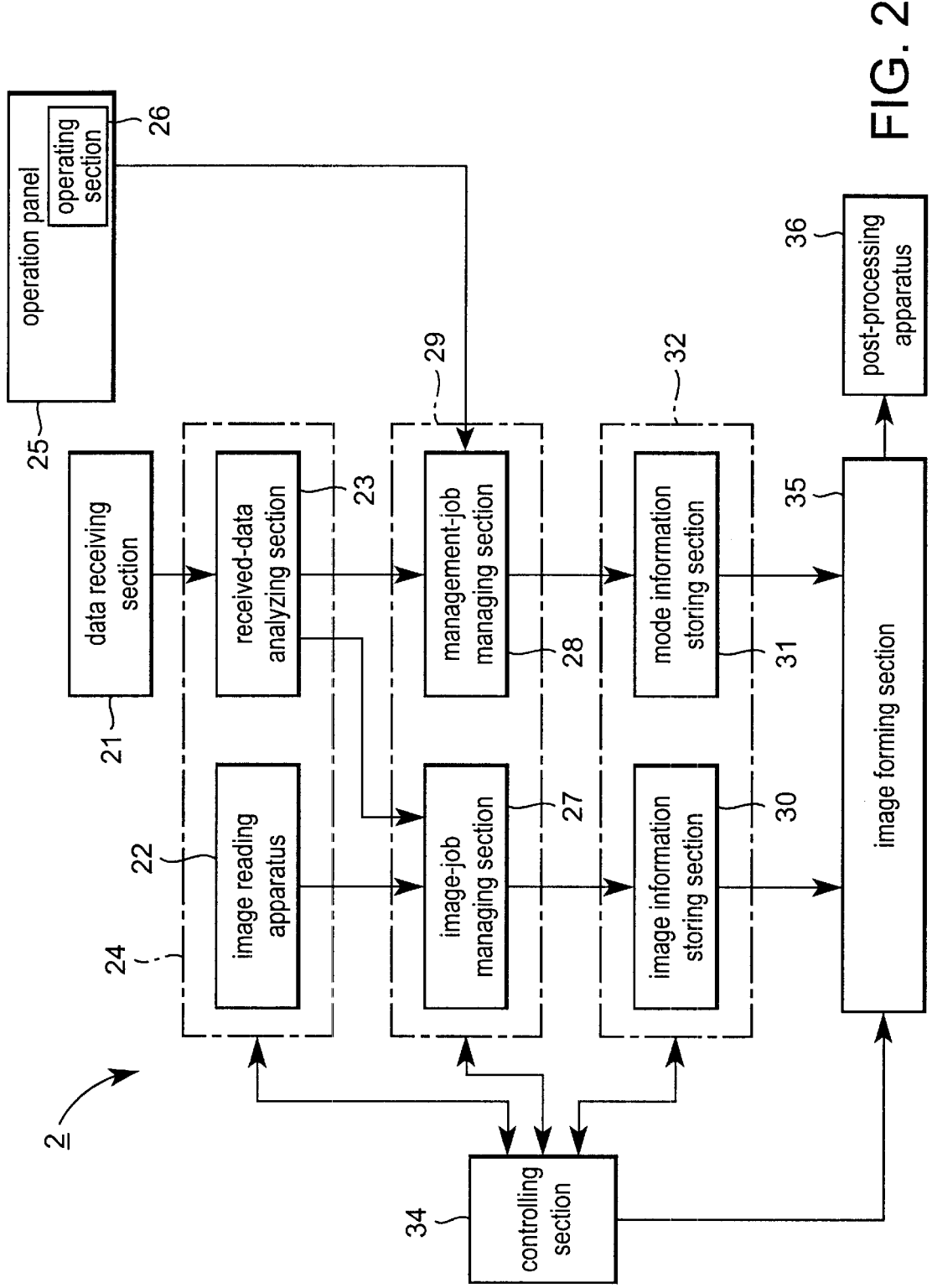
FIG. 2 is a block diagram showing the electrical configuration of an image forming apparatus in an image forming system according to the invention.

As shown in FIG. 2, the image forming apparatus 2 comprises the data receiving section 21; an image inputting block 24 having an image reading apparatus 22 and a received-data analyzing section 23; an operation panel 25 having an operating section 26; a job managing block 29 having an image-job managing section 27 and a management-job managing section 28; a storing block 32 having an image information storing section 30 and a mode information storing section 31; a controlling section 34; an image forming section 35; and a post-processing apparatus 36.

The image reading apparatus 22 reads an image placed on a manuscript stand and has a known configuration. The received-data analyzing section 23 analyzes image data received from the PC's 3 via the data receiving section 21.

Regarding the operation panel 25, users perform various input operations through the operating section 26. In addition to the operating section 26 used for the input operation by the users, a displaying section 41 is provided for the purpose of displaying the contents of the input operations and displaying a management-job registering screen and a management-job selecting screen which are described later.

Figure 3:
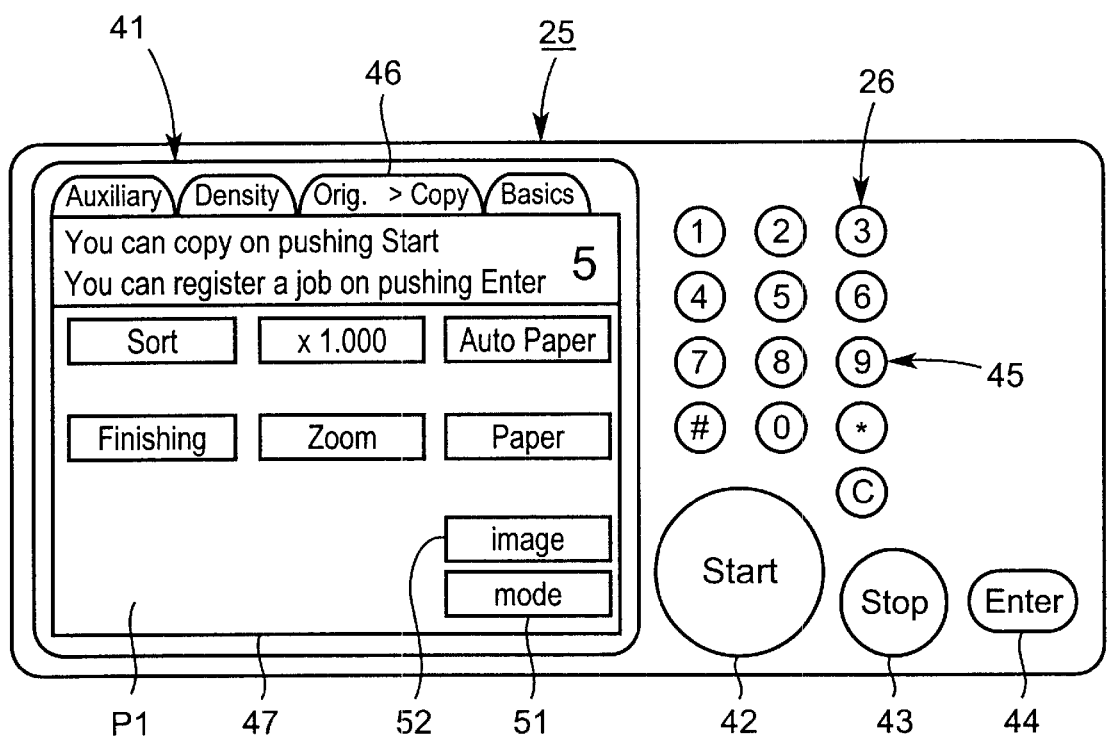
FIG. 3 is a view of an operation panel of an image forming apparatus according to the invention, the operation panel showing a management-job registering screen.

The operating section 26 comprises a start button 42; a stop button 43; and an enter key 44 used for determining the registration of management jobs and the like; and ten keys 45, as shown in FIG. 3.

The displaying section 41 is composed of an LCD and the like and comprises a mode displaying region 46 and a process-contents displaying region 47. In the process-contents displaying region 47, various screens such as a management-job selecting screen P1 (FIG. 3) are displayed.

The image-job managing section 27 receives and manages image jobs including both manuscript image data read by the image reading apparatus 22 and image data received from one of the PC's 3, thereby storing and registering the image jobs into the image information storing means 30 in response to an operation via the operating section 26 or an instruction from one of the PC's 3. The image-job managing section 27 further serves as selecting means for selecting an image job among the image jobs stored in the image information storing means 30 in response to an operation via the operating section 26 or an instruction from one of the PC's 3.

The management-job managing section 28 defines linkage data (for example, the order of linking the objective image jobs) used for linking a plurality of image jobs in the image-job managing section 27 in response to an operation via the operating section 26 or an instruction from the PC 3, thereby storing and registering the data as a linkage management job into the mode information storing means 31. Further, the management-job managing section 28 defines an image formation mode in response to an operation via the operating section 26 or an instruction from one of the PC's 3, thereby storing and registering the data as an image formation mode management job into the mode information storing means 31. The management-job managing section 28 further serves as selecting means for selecting a predetermined management job among the plurality of linkage management jobs and image formation mode management jobs stored in the mode information storing means 31 in response to an operation via the operating section 26 or an instruction from one of the PC's 3.

The controlling section 34 controls the overall apparatus, and causes the execution of linking the plurality of image jobs according to the linkage data defined in the selected linkage management job.

The image forming section 35 performs the printing of the image data of a plurality of image jobs in a linked state with each other onto a printing sheet, for example, by using an electrophotographic method, according to the linkage data of a linkage management job. The post-processing apparatus 36 performs a stapling process, a punching process, or the like onto the printed sheets.

Next, described below is the procedure for preparing a document by the image forming system 1 linking a plurality of image jobs.

The description below is made for a case when a color thick paper sheet is inserted between every adjacent chapters of a document composed of a plurality of chapters, and that other document data consisting of both the chapter number and an image is printed onto each thick paper sheet.

Either document data (image data) read by the image reading apparatus 22 or document data (image data) sent from one of the PC's 3 is stored (registered) as a first image job.

In the registration of the image job, the operation panel 25 is used. During this operation, the displaying section 41 displays a job registration screen P1 shown in FIG. 3. The job registration screen P1 comprises a "mode" key 51 for registering an image formation mode as an image formation mode management job and an "image" key 52 for registering image data as an image job. The selected mode or nonselected mode of keys 51 and 52 can be selected. When both the "mode" and "image" keys are selected, both image data and an image formation mode for the image can be registered as a single image job. When the enter key 44 is operated, the registration is carried out via the image-job managing section 27 and the management-job managing section 28. In this example, the selected state of the "mode" key 51 and the "image" key 52 is indicated by white characters on a black background, whereas the nonselected state is indicated by black characters on a white background.

Figure 4:
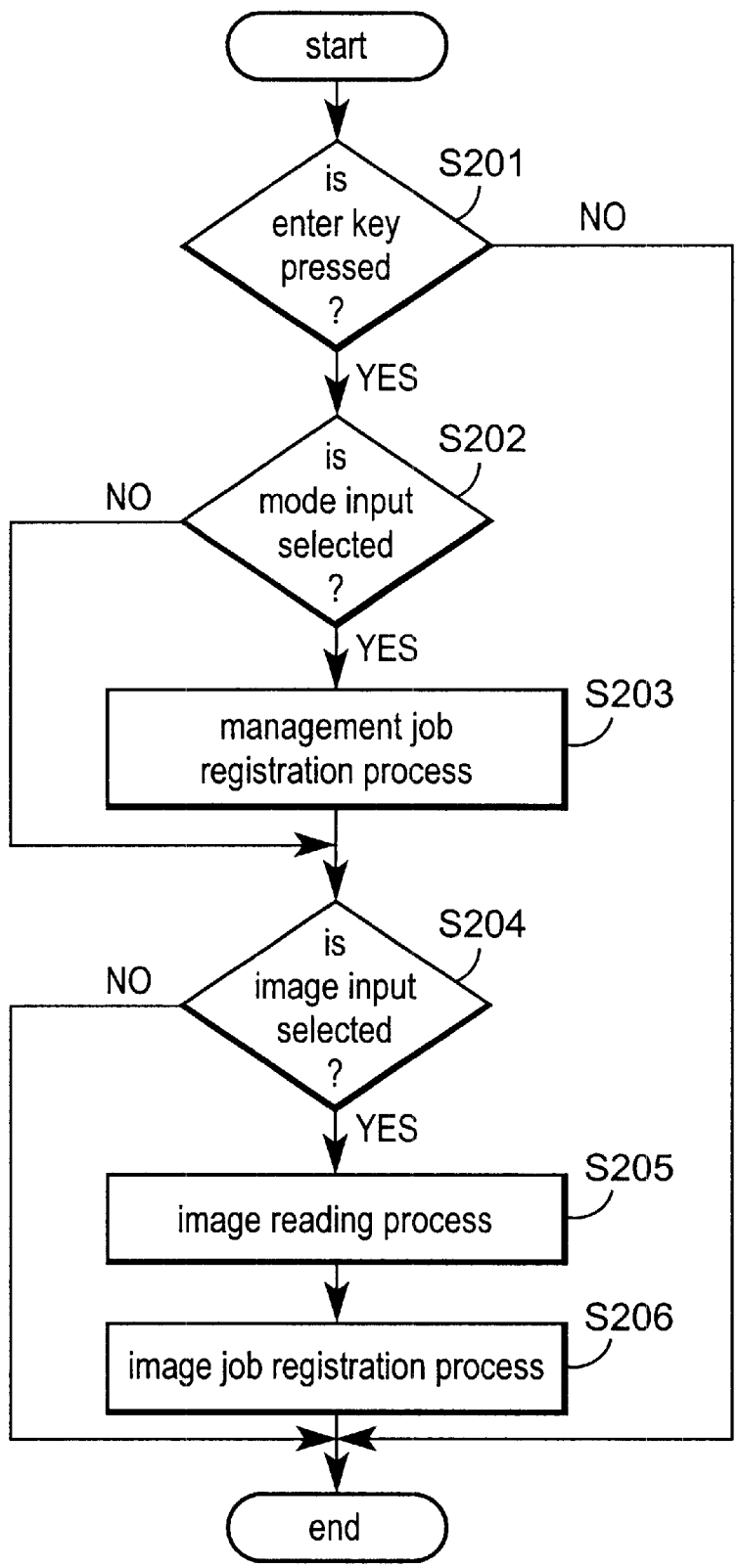
FIG. 4 is a flow chart showing the process of inputting both an image job and a management job including an image formation mode, by using an operation panel.

The process of inputting both an image job and an image formation mode management job by using the operation panel 25 is described below with reference to the flow chart of FIG. 4. In the following description and figures, "S" denotes a "step".

In S201, the controlling section 34 determines whether the enter key 44 of FIG. 3 is pressed or not. When the enter key 44 is pressed (YES in S201), in S202, it is determined whether the mode input by the "mode" key 51 is selected or not. When the enter key 44 is not pressed (NO in S201), the process is terminated.

When the mode input by the "mode" key 51 is selected (YES in S202), in S203, management job registration is processed, whereby an image formation mode management job is stored and registered into the mode information storing section 31. In S204, the controlling section 34 determines whether the image input by the "image" key 52 is selected or not. When the image input is selected (YES in S204), in S205, image reading is processed, and then in S206, image job registration is processed. After the image job is stored and registered into the image information storing section 30, the routine is terminated.

Figure 5:
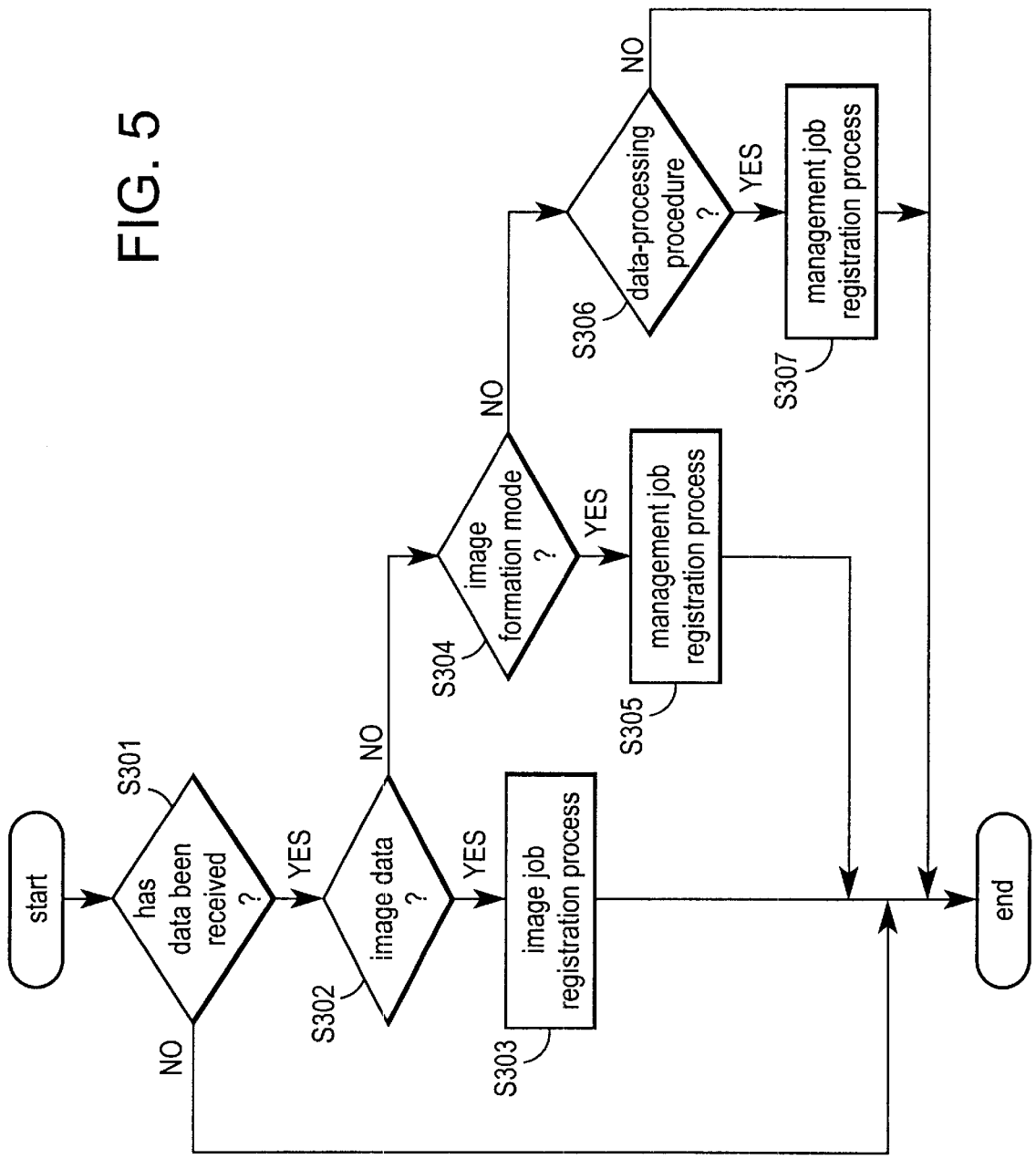
FIG. 5 is a flow chart showing the process of inputting both image jobs and management jobs including an image formation mode, by using data receiving means.

When the mode input is not selected (NO in S202), the flow proceeds to S204. When the image input is not selected (NO in S204), the routine is terminated. In place of the image job generated by reading by the image reading apparatus 22, an image job used may be a print job generated by an application in one of the PC's 3 and received via the data receiving section 21. The process of inputting both the image job and the image formation mode management job in this case is described below with reference to the flow chart of FIG. 5.

In S301, the controlling section 34 determines whether the data receiving section 21 has received data. When data has been received (YES in S301), in S302, it is determined whether the received data is image data or not. When data has not been received (NO in S301), the routine is terminated. When the received data is image data (YES in S302), in S303, image job registration is processed. After the image job is stored and registered into the image information storing section 30, the routine is terminated.

When the received data is not image data (NO in S302), in S304, it is determined whether the received data is an image formation mode or not. When the received data is an image formation mode (YES in S304), in S305, registration of an image formation mode management job is processed. After the image formation mode management job is stored and registered into the mode information storing section 31, the routine is terminated.

When the received data is not an image formation mode (NO in S304), in S306, it is determined whether the received data is data for a data-processing procedure, which data is an example of linkage data, or not. When the received data is data for a data-processing procedure (YES in S306), registration of a linkage management job is processed. After the linkage management job is stored and registered into the mode information storing section 31, the routine is terminated. When the received data is not data for data-processing procedure (NO in S306), the routine is terminated.

As such, the first image job containing the above-mentioned document data is stored and registered into the image information storing section 30. After that, in a similar manner, data for the separating sheets between the chapters of the document is read by the image reading apparatus 22 or alternatively transmitted from one of the PC's 3, thereby being stored and registered as a second image job.

After that, first mode data is input, and is stored as a first image formation mode management job into the mode information storing section 31.

An example of the first mode data is "A4, unity magnification, 1 in 1, both-side printing, left-side binding, 10-mm binding margin, ordinary printing paper, automatic feeder."

After that, second mode data is input, and is stored as a second image formation mode management job.

An example of the second mode data is "A4, unity magnification, 1 in 1, single-side printing, specified feeder, printing paper according to the feeder."

Then, provided is linkage data including both the data specifying the order of linking the image jobs and the data for post-processing after linking the image jobs, thereby being stored as a linkage management job into the mode information storing section 31.

An example of the linkage data is "a sheet having the first data printed to be added as a front cover, while a sheet having the second data printed to be inserted between pages 9 and 10, between pages 48 and 49, and between pages 63 and 64, and to be added as a back cover."

Figure 6:
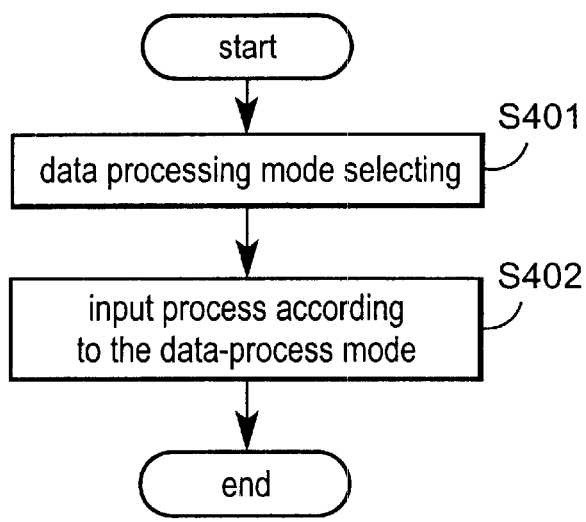
FIG. 6 is a flow chart showing the process of inputting management jobs.

The process of inputting the linkage management job for linking the plurality of image jobs is described below with reference to both the flow chart of FIG. 6 and FIG. 8.

Figure 8:
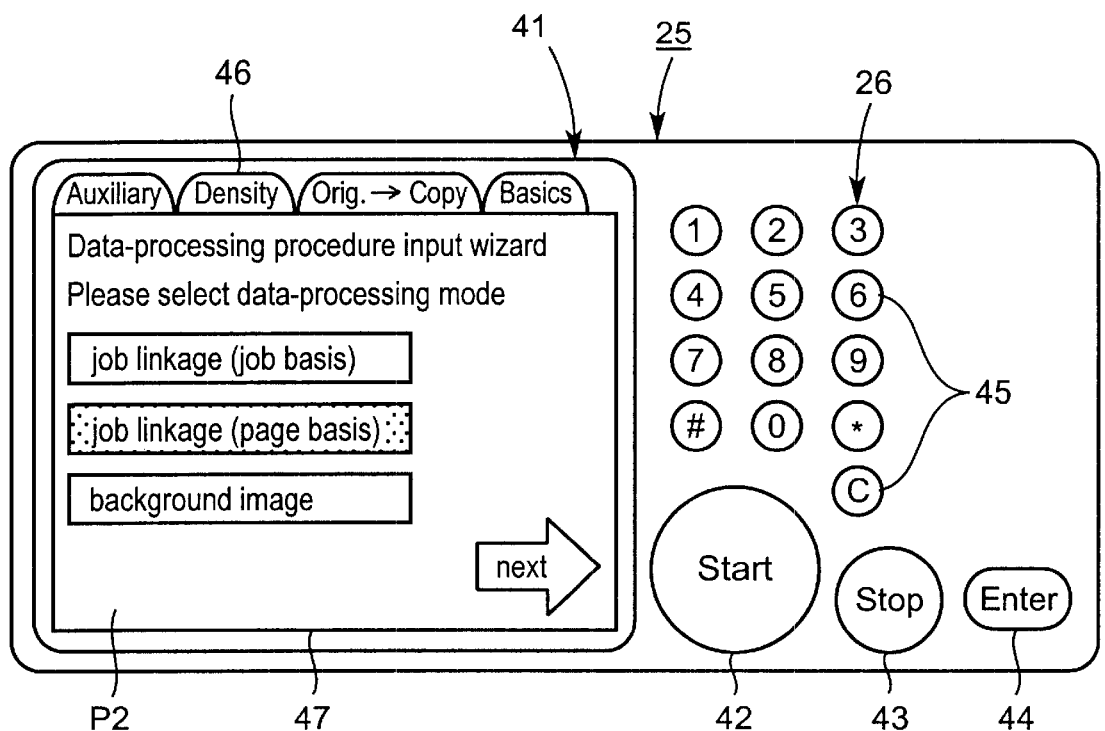
FIG. 8 is a front view of an operation panel showing a screen for selecting a data process mode.
Figure 9B:
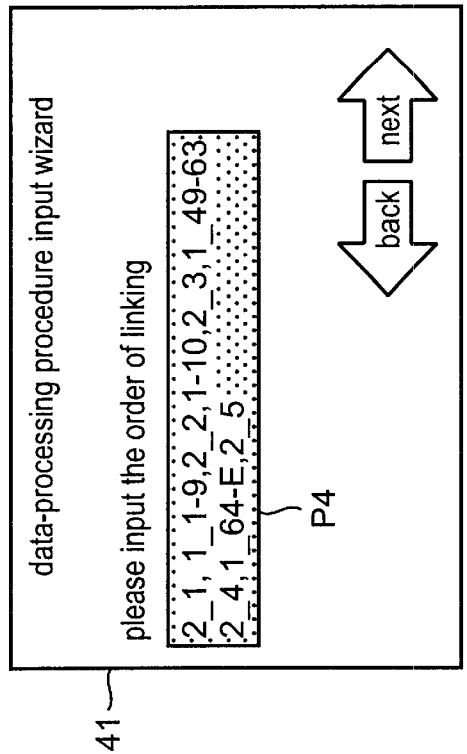
FIG. 9(b) is a diagram showing a screen for inputting the order of linking the image jobs.
Figure 9D:
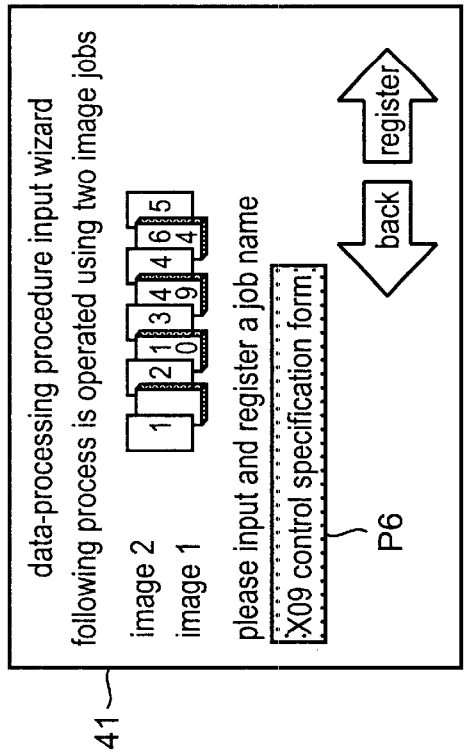
FIG. 9(d) is a diagram showing a screen for inputting a management job name.
Figure 9A:
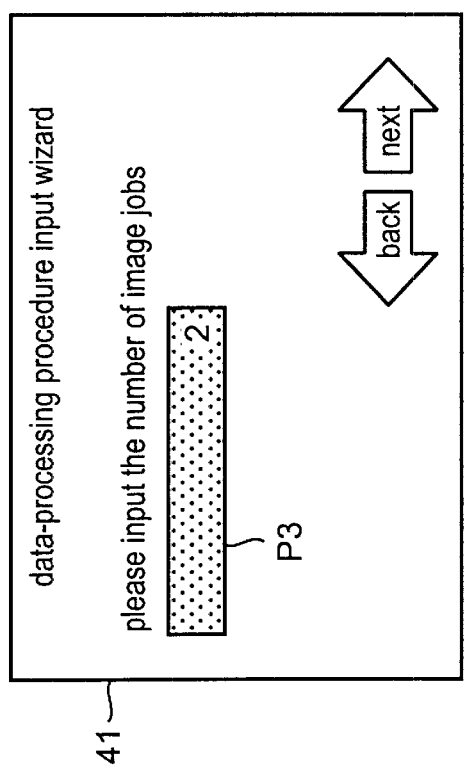
FIG. 9(a) is a diagram showing a screen for inputting the number of image jobs.
Figure 9C:
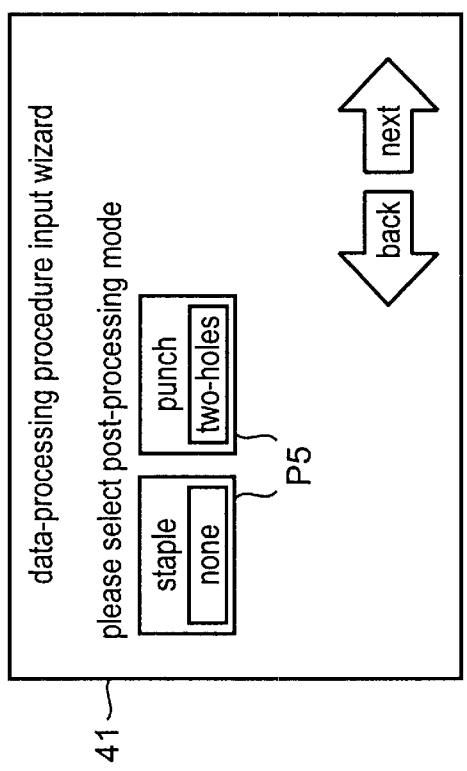
FIG. 9(c) is a diagram showing a screen for selecting a post-process mode.

A screen P2 for selecting a data-processing mode as shown in FIG. 8 is displayed on the displaying section 41 of the operation panel 25. In S401, data-processing mode selecting is processed. For example, when "job linkage (page basis)" is selected among the data-process modes, in S402, the input is processed according to the data-processing mode.

Figure 7:
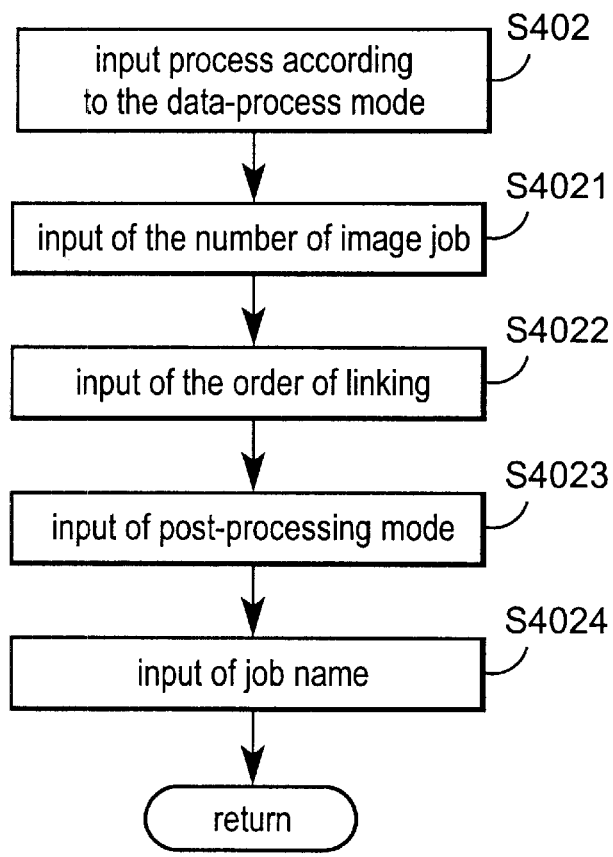
FIG. 7 is a flow chart of a subroutine for the input process according to the process mode shown in FIG. 6.

A subroutine for processing the input according to the data-processing mode is described below with reference to the flow chart of FIG. 7 and the screen transition diagrams of FIGS. 8 and 9.

On the data-processing mode selecting screen P2 shown in FIG. 8, "job linkage (page basis)" is confirmed with the enter key 44, and "next" is operated. Then, the screen P2 changes into a screen P3 for inputting the number of image jobs as shown in FIG. 9(*a*). The number of image jobs to be linked, for example, 2, is input, and "next" is operated. Then, in S4021, the input of the number of image jobs is processed. At the same time, the screen P3 changes into a screen P4 for inputting the order of linkage as shown in FIG. 9(*b*).

On the screen P4, the order of linkage such as "page 1 of image job 2, pages 1–9 of image job 1, . . . , page 64-last page of image job 1, page 5 of image job 2" is input, and "next" is operated. Then, in S4022, the input of the order of linking the image jobs is processed. At the same time, the screen P4 changes into a screen P5 for selecting a post-process mode as shown in FIG. 9(*c*).

In the present embodiment, the order of linkage is input with numerals and symbols as shown in FIG. 9(*b*). However, the input operation may be user friendly by means of an icon selection. Further, the number of jobs to be linked may be automatically recognized from the analysis of the input of the order of linkage.

On the screen P5, a post-process mode such as "staple" and "punch" is input, and "next" is operated. Then, in S4023, the input of the post-processing mode is processed. At the same time, the screen P5 changes into a screen P6 for registering a management job name as shown in FIG. 9(*d*).

On the screen P6, a management job name (for example, "X09 control specification form") is input, and "register" is operated. Then, in S4024, the management job is registered with the input management job name. Then, the process returns.

As such, a linkage management job defining the linkage data is stored and registered into the mode information storing section 31.

In a similar manner, another linkage management job defining linkage data is registered. After such operations, a plurality of linkage management jobs each containing linkage data for linking a plurality of image jobs, each including image data, are stored in the mode information storing section 31 of the storing section 32.

When the linkage data defined in the linkage management job is the order of linking the plurality of image jobs, the plurality of image jobs are linked in the order. Further, when the linkage management job includes a post-processing mode for the linked image jobs, the post-processing according to the defined post-processing mode is carried out.

When the linkage data defined in the linkage management job includes data for image-processing onto the image jobs, the defined image-processing is performed onto the image jobs during the linkage.

Figure 10:
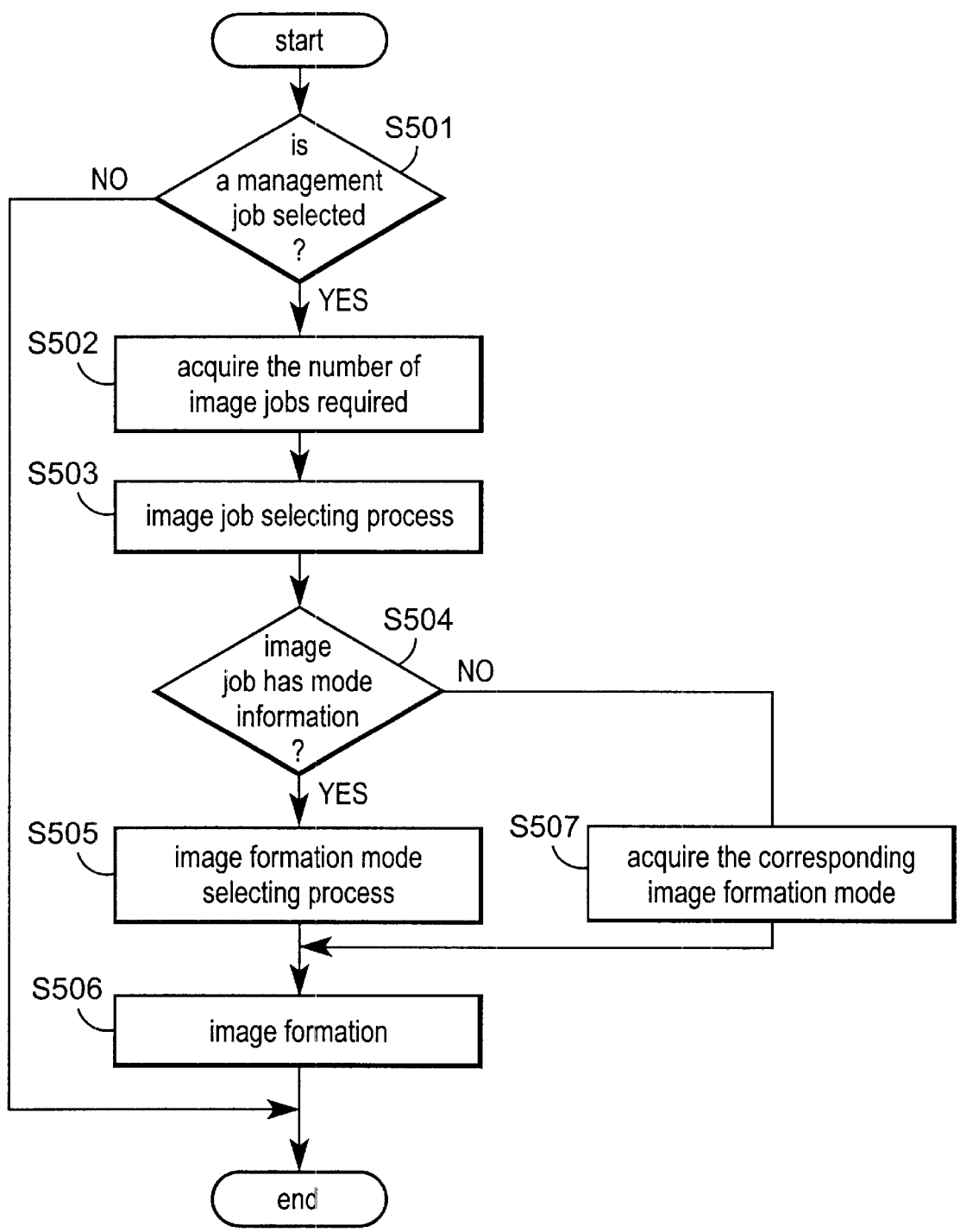
FIG. 10 is a flow chart showing the process of linking image jobs and thereby forming an image.

The linking of image jobs by a linkage management job is described below with reference to the flow chart of FIG. 10 and the screen transition diagrams of FIGS. 11 and 12.

Figure 11:
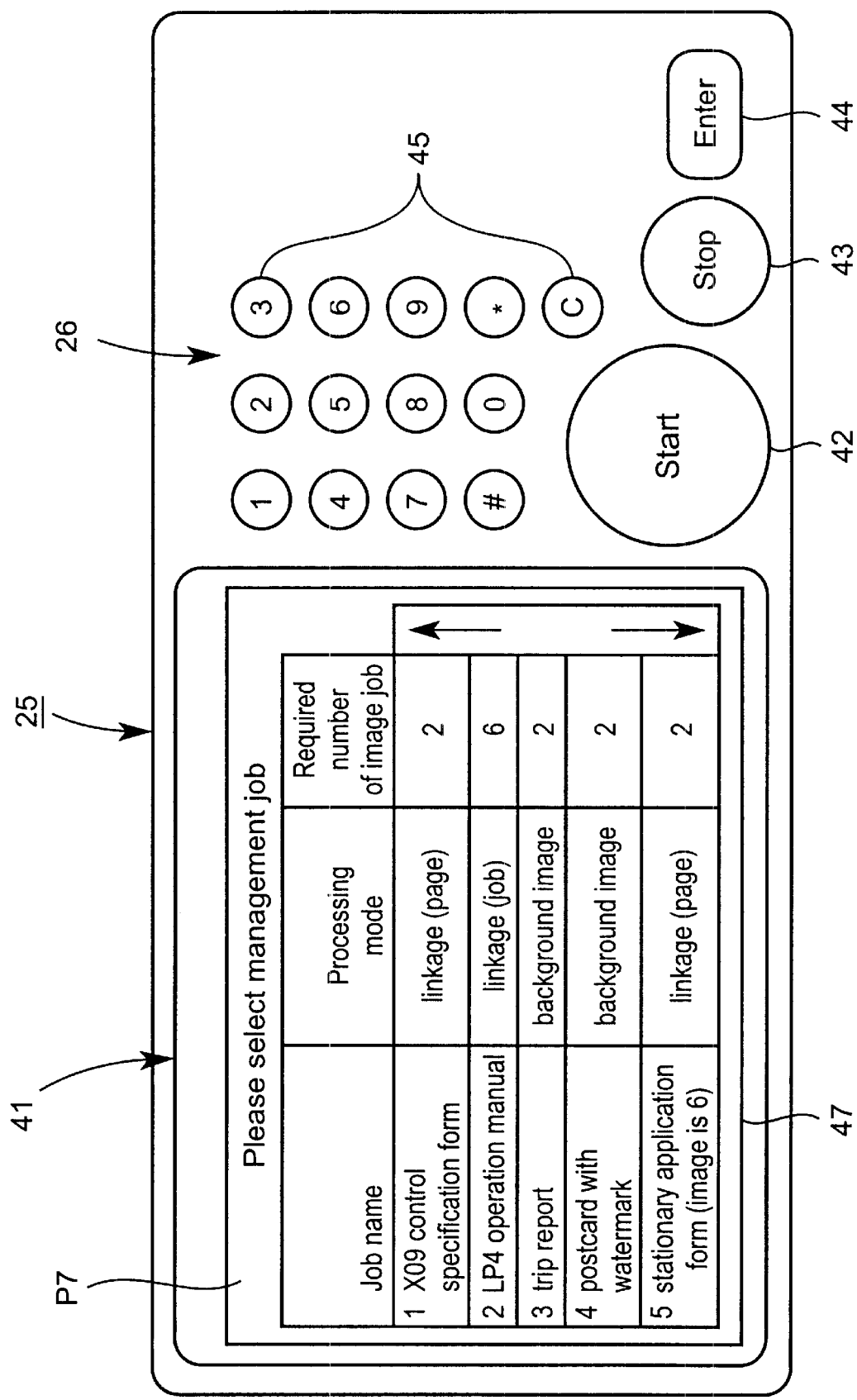
FIG. 11 is a front view of an operation panel showing a screen for selecting a management job.

Screen P7 for selecting a management job as shown in FIG. 11 is displayed on the displaying section 41. Then, a desired linkage management job is selected.

In S501, the controlling section 34 determines whether a linkage management job is selected or not. For example, when the linkage management job named "X09 control specification form" is selected and the enter key 44 is operated (YES in S501), in S502, the controlling section 34 acquires the number of image jobs required by the selected linkage management job, and the screen P7 changes into screen P8 for selecting image jobs as shown in FIG. 12(*a*). The acquired number of image jobs are displayed on the screen.

In this example, the acquired number of image jobs is "2." After the selection of the first and second image jobs described above, "next" is operated. Then, in S503, the selection is processed. In S504, it is determined whether the image job has mode information for the image or not, that is, whether the image job is related to an image formation mode or not. When the image job is not related to an image formation mode (NO in S504), the screen P8 changes into screen P9 for selecting an image formation mode of the first image job (image job 1 in the figure) as shown in FIG. 12(*b*).

In this example, the first image job does not contain mode information for the image. On the screen P9 for selecting an image formation mode as shown in FIG. 12(*b*), the first image formation mode management job described above is selected, and "next" is operated. Then, in S505, the selection of the image formation mode is processed. Then, the screen P9 for selecting an image formation mode of the first image job changes into screen P10 for selecting an image formation mode of the second image job (image job 2 in the figure) as shown in FIG. 12(c).

In this example, similarly to the first image job, the second image job does not contain mode information for the image. On the screen P10 for selecting an image formation mode as shown in FIG. 12(c), the second image formation mode management job described above is selected, and "complete" is operated. Then, the selection of the image formation mode in S505 is processed.

After the selection of the image formation mode is processed, in S506, the first and second image jobs undergo image formation according to the image formation modes of the first and second image formation mode management jobs, thereby being printed out from the image forming section 35 in a linked state according to the linkage data of the linkage management job.

In S504, when the image job is related to an image formation mode (YES in S504), in S507, the corresponding image formation mode is acquired, and then in S506, image formation is carried out.

As described above, linkage data for linking a plurality of image jobs containing image information, or equivalently a plurality of linkage management jobs defining, for example, the order of linking image jobs, is previously stored into the storing section 32. In linking the image jobs, one of the registered linkage management jobs is selected, and arbitrary image jobs to be linked are selected among the plurality of image jobs. Then, the image forming section 35 is controlled by the controlling section 34 on the basis of the linkage data, whereby image formation is carried out.

As is understood from the description, the information of the plurality of image jobs can be treated independently of the information of the linkage data for linking the image jobs. This permits easy preparation of a document composed of plural kinds of images and printing sheets.

Further, the number of image jobs to be linked by the selected linkage management job is displayed, and hence the number of necessary image jobs is easily understood.

Described below is a case of correcting a linked document.

The description below is made for the case that the image data of the second image job has a data error, and that after the correction, a trial printing is carried out on an ordinary paper sheet instead of a thick paper sheet.

First, corrected image data is read in, whereby the second image job is stored again and reregistered. The second mode data is also stored again and reregistered together with the corrected image data for the second image job as a corrected second image formation mode management job. An example of the reregistered second mode data is "A4, unity magnification, 1 in 1, single-side printing, specified feeder, ordinary printing paper, automatic feeder."

Figure 12A:
FIG. 12(a) is a diagram showing a screen for selecting the number of image jobs.
Figure 12B:
FIG. 12(b) is a diagram showing a screen for selecting an image formation mode.

Through both the screen P8 (FIG. 12(a)) for selecting image jobs and the screen P10 (FIG. 12(c)) for selecting an image formation mode, both the original second image job and the original second image formation mode management job are deleted. After that, both the corrected second image job and the reregistered second image formation mode management job are selected. And, the "complete" button is pressed. Then, the corrected second image job is trial-printed on an ordinary paper sheet, and the image formation is carried out in the state in which the first image job and the second image job are linked.

As such, when a part of linked image jobs needs to be replaced, the image job alone needs to be stored and registered, whereas the linkage management job is left intact. This simplifies the work of correction.

Next, another embodiment of the invention is described below for the case of linking an image as a background image.

The description below is made for the case where an image job mainly containing character information is provided with a background image of a job having color image data. Since the background image data is a color image, the superposition in the intact form causes a difficulty in visibility of the character data. In order to avoid this difficulty, the lightness is increased, and the saturation is reduced before the superposition.

First, the document data mainly containing character information is read in, thereby being stored and registered as a first image job. Then the image data for background image is read in, thereby being stored and registered as a second image job. The storing and registering of the image jobs is carried out by using the operation panel 25 with displaying the job registering screen P1 shown in FIG. 3 on the displaying section 41 in a similar manner to the above-mentioned case.

Figure 13:
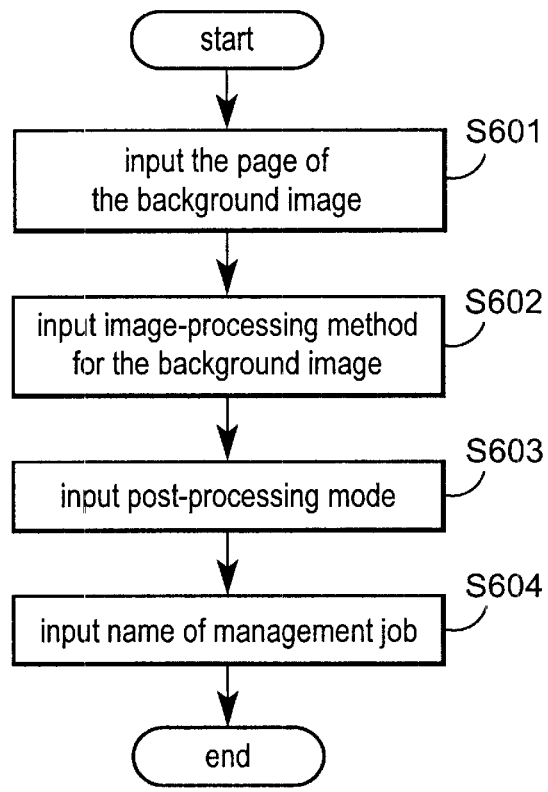
FIG. 13 is a flow chart of an input process according to a process mode when a background image is selected.

The storing and registering of a linkage management job is described below with reference to the flow chart of FIG. 13 and the screen transition diagrams of FIGS. 14 and 15.

Figure 14:
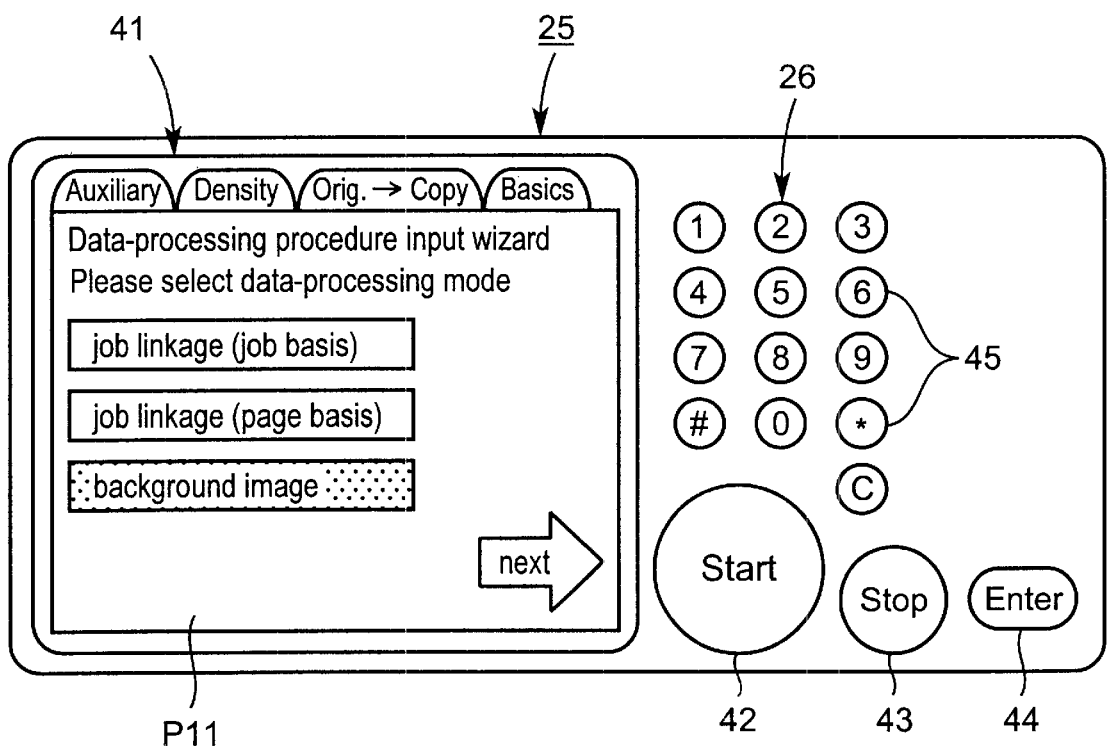
FIG. 14 is a front view of an operation panel showing a screen for selecting a background image.
Figure 15B:
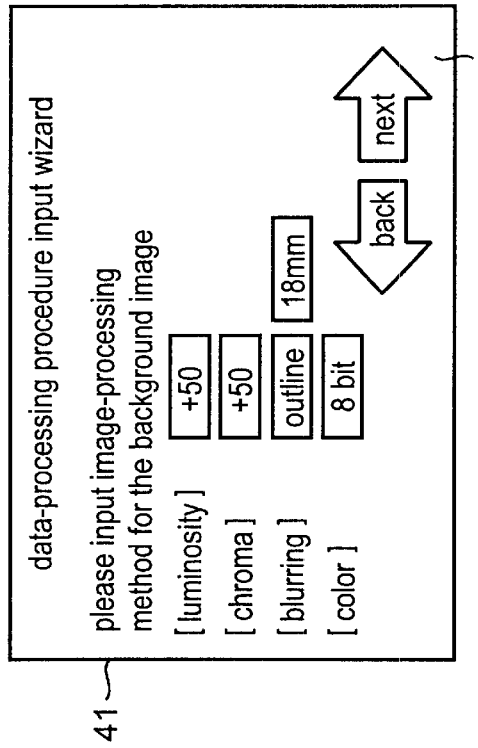
FIG. 15(b) is a diagram showing a screen for specifying image processing onto a background image.
Figure 15D:
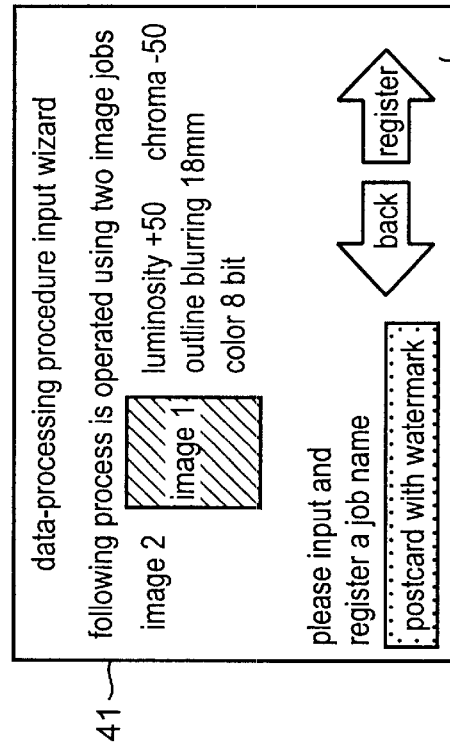
FIG. 15(d) is a diagram showing a screen for inputting a management job name.
Figure 15A:
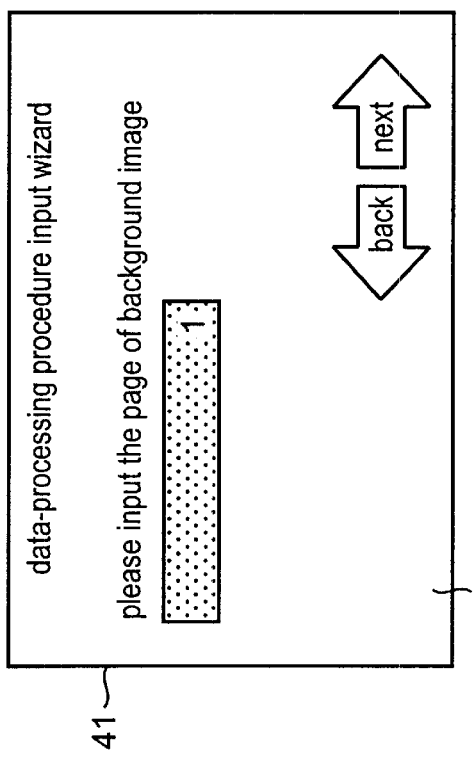
FIG. 15(a) is a diagram showing a screen for specifying the page of a background image.

First, the displaying section 41 displays screen P11 for selecting a data-processing mode as shown in FIG. 14. The "background image" is selected, and confirmed with the enter key 44. After that, "next" is operated. Then, the screen P11 changes into screen P12 for selecting the number of pages as shown in FIG. 15(a).

When the background image for the first image job is to be page 1 of the second image job, "1"is input on the screen P12, and then "next" is operated. Then, in S601, the input of the page of the background image is processed. At the same time, the screen P12 changes into screen P13 for specifying image processing as shown in FIG. 15(b).

Figure 15C:
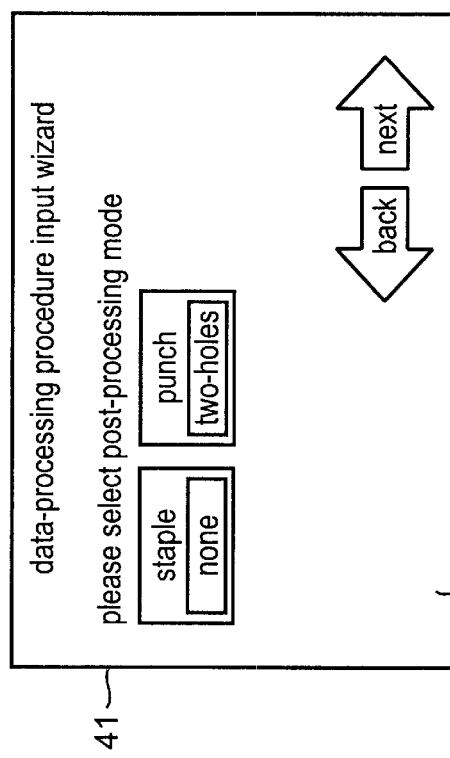
FIG. 15(c) is a diagram showing a screen for selecting a post-process mode.

On the screen P13, a data-processing procedure is input so as to increase the lightness and reduce the saturation of the image of page 1 to be used as the background image. Then "next" is operated. Then, in S602, the input of the image-processing method for the background image is processed. At the same time, the screen P13 changes into screen P14 for selecting a post-processing mode as shown in FIG. 15(c).

On the screen P14, a desired post-processing mode is selected, and "next" is operated. Then, in S603, the input of the post-processing mode is processed. At the same time, the screen P14 changes into screen P15 for registering a management job name as shown in FIG. 15(d).

On the screen P15, a management job name (for example, "post card with water mark") is input. Then, in S604, the management job is stored and registered with the input job name into the mode information storing section 31.

In the linking of the image jobs, similarly to the above-mentioned embodiment, the displaying section 41 displays the screen P7 for selecting a linkage management job as shown in FIG. 11. Then, "post card with water mark" is selected. The number of image jobs required by the selected management job is displayed. Thus, image jobs in that number are selected. In this example, the number of image jobs is "2". Accordingly, a first image job and a second image job are selected.

After that, according to the data-processing procedure contained in the linkage management job, the lightness of the image of page 1 of the second image job is increased, and the saturation is reduced. The data is registered into the image information storing section 30 or alternatively into a memory for background images (not shown). Then, starting from page 1 of the first image job, the foreground image is superposed with the background image of the second image job stored in the memory for background images, thereby being output on a printing sheet.

In accordance with the present invention, a plurality of management jobs each defining linkage data for linking a plurality of image jobs each containing image data are stored. The plurality of management jobs are used as default in linking the plurality of image jobs. When a predetermined management job is selected, the plurality of image jobs are linked on the basis of the linkage data defined in the selected management job. Accordingly, the information of the plurality of image jobs can be treated independently of the information of the data for linking the plurality of image jobs. This permits easy preparation of various linked documents composed of a plurality of images.

In addition, a plurality of image jobs can be linked in a predetermined order of linkage.

In addition, a predetermined post-processing can be applied to linked image jobs.

In accordance with the present invention, a second image job can be linked as a background image to a first image job.

In accordance with the present invention, a predetermined image-processing may be applied to image jobs during the linking of the image jobs.

In addition, a plurality of image jobs in the number required by a selected management job can be selected, and then linked according to the selected management job.

In addition, in linking a plurality of image jobs, a predetermined management job is selected among the management jobs stored in storing means, and image forming means outputs the plurality of image jobs in a linked state with each other on the basis of the linkage data defined in the selected management job. This configuration permits easy acquisition of a linked document.

In accordance with the present invention, in linking a plurality of image jobs received from external computers, a predetermined management job is selected among a plurality of management jobs stored in storing means, and the plurality of image jobs are linked on the basis of the linkage data defined in the selected management job. Accordingly, the information of the plurality of image jobs can be treated independently of the information of the data for linking the image jobs. This permits easy preparation of a linked document.

Also, in accordance with the present invention, in linking a plurality of image jobs, a predetermined management job is selected among a plurality of management jobs stored in storing means, and the plurality of image jobs are linked on the basis of the linkage data defined in said selected management job.

In addition, linkage is processed on a page basis.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An image processing apparatus comprising:
    a memory for storing a plurality of management jobs, each of the management jobs defining linkage data for linking a plurality of image jobs, each of the image jobs containing image data;
    a selector for selecting a management job among said plurality of management jobs stored in said memory; and
    a controller for linking said plurality of image jobs based on the linkage data defined in said management job selected by said selector.

2. The image processing apparatus of claim 1, wherein said linkage data defined in each of said management jobs is data indicating the order of linking said plurality of image jobs.

3. The image processing apparatus of claim 1, wherein said linkage data defined in each of said management jobs includes data indicating a post-processing to be applied to the linked image jobs.

4. The image processing apparatus of claim 1, wherein said linkage data defined in each said management job is data for linking a second image job as a background image to a first image job.

5. The image processing apparatus of claim 1, wherein said linkage data defined in each said management job includes data indicating image processing to be applied to said plurality of image jobs.

6. The image processing apparatus of claim 1, further comprising an image-job selector for selecting a plurality of image jobs to be linked according to said selected management job.

7. The image processing apparatus of claim 1, wherein the linkage data is processed on a page basis.

8. The image processing apparatus of claim 1, wherein at least one of the image jobs further includes image formation mode data.

9. An image forming apparatus comprising:
    a memory for storing a plurality of management jobs, each of the plurality of management jobs defining linkage data for linking a plurality of image jobs, each of the plurality of image jobs containing image data;
    a selector for selecting a management job among said plurality of management jobs stored in said memory;
    an image forming device; and
    a controller for causing said image forming device to output said plurality of image jobs in a linked state with each other based on the linkage data defined in said management job selected by said selector.

10. The image forming apparatus of claim 9, wherein at least one of the image jobs further includes image formation mode data.

11. An image processing system comprising:
    a memory for storing a plurality of management jobs, each of the plurality of management jobs defining linkage data for linking a plurality of image jobs, each of the plurality of image jobs containing image data received from an external computer;
    a selector for selecting a management job among said plurality of management jobs stored in said memory; and
    a controller for causing the process of linking said plurality of image jobs based on the linkage data defined in said management job selected by said selector.

12. The image processing system of claim 11, wherein at least one of the image jobs further includes image formation mode data.

13. An image-job linking method for linking a plurality of image jobs, each of the image jobs containing image data, comprising the steps of:

storing in a memory a plurality of management jobs, each of the plurality of management jobs defining linkage data for linking said plurality of image jobs;

selecting one of the management jobs from said memory; and linking said plurality of image jobs based on the linkage data defined in said selected management job.

14. The method of claim 13, wherein at least one of the image jobs further includes image formation mode data.

15. An image processing method comprising:

storing a plurality of management jobs, each of the plurality of management jobs defining linkage data for linking a plurality of image jobs, each of the plurality of image jobs containing image data;

selecting a management job among said plurality of stored management jobs; and outputting said plurality of image jobs in a linked state with each other based on the linkage data defined in said selected management job.

16. The method of claim 15, wherein at least one of the image jobs further includes image formation mode data.

17. An image processing method comprising:

receiving image data from an external computer;

storing in a memory a plurality of management jobs, each of the plurality of management jobs defining linkage data for linking a plurality of image jobs, each of the plurality of image jobs containing the image data received from the external computer;

selecting a management job among said plurality of management jobs stored in said memory; and linking said plurality of image jobs based on the linkage data defined in said selected management job.

18. The method of claim 17, wherein at least one of the image jobs further includes image formation mode data.

* * * * *